April 30, 1957 L. W. BEDKER 2,790,325
MACHINE TOOL SLIDE
Filed June 7, 1954 2 Sheets-Sheet 2
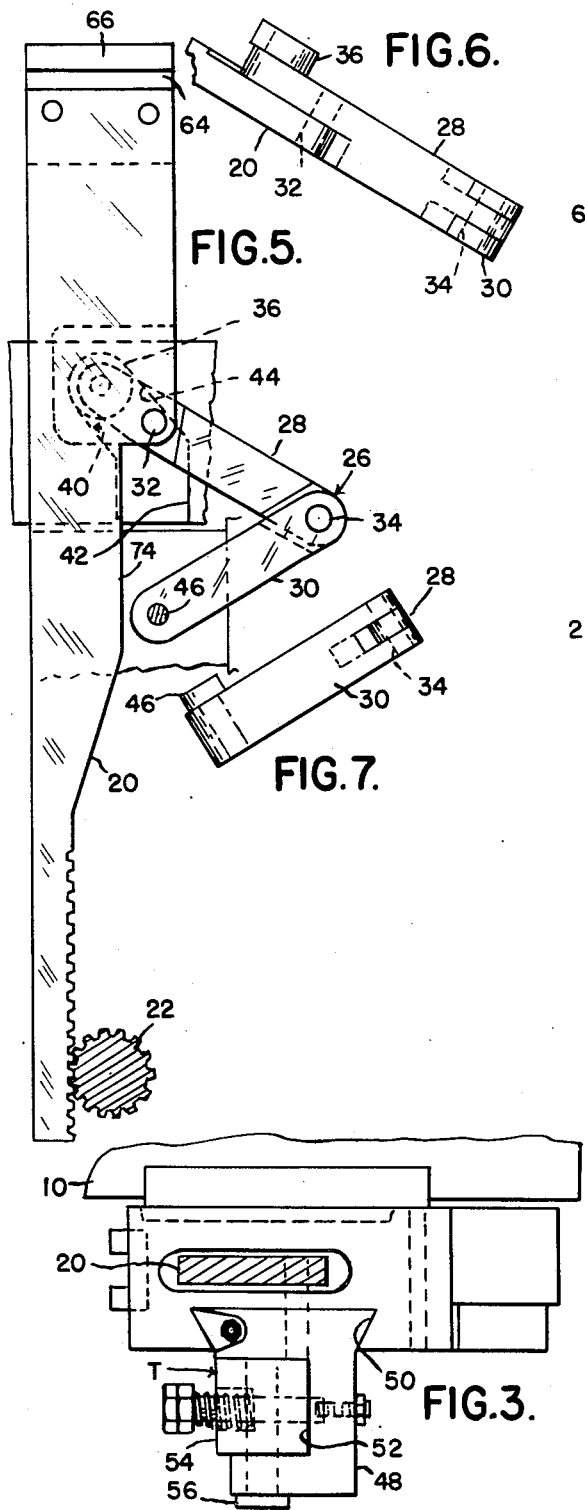
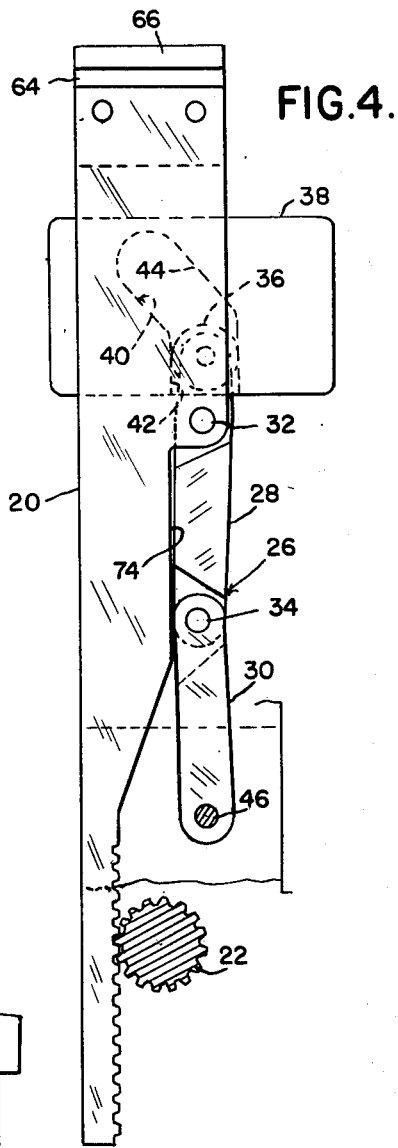
INVENTOR.
LEO W. BEDKER
BY Whittemore
Hulbert & Belknap
ATTORNEYS dable # United States Patent Office 2,790,325
Patented Apr. 30, 1957

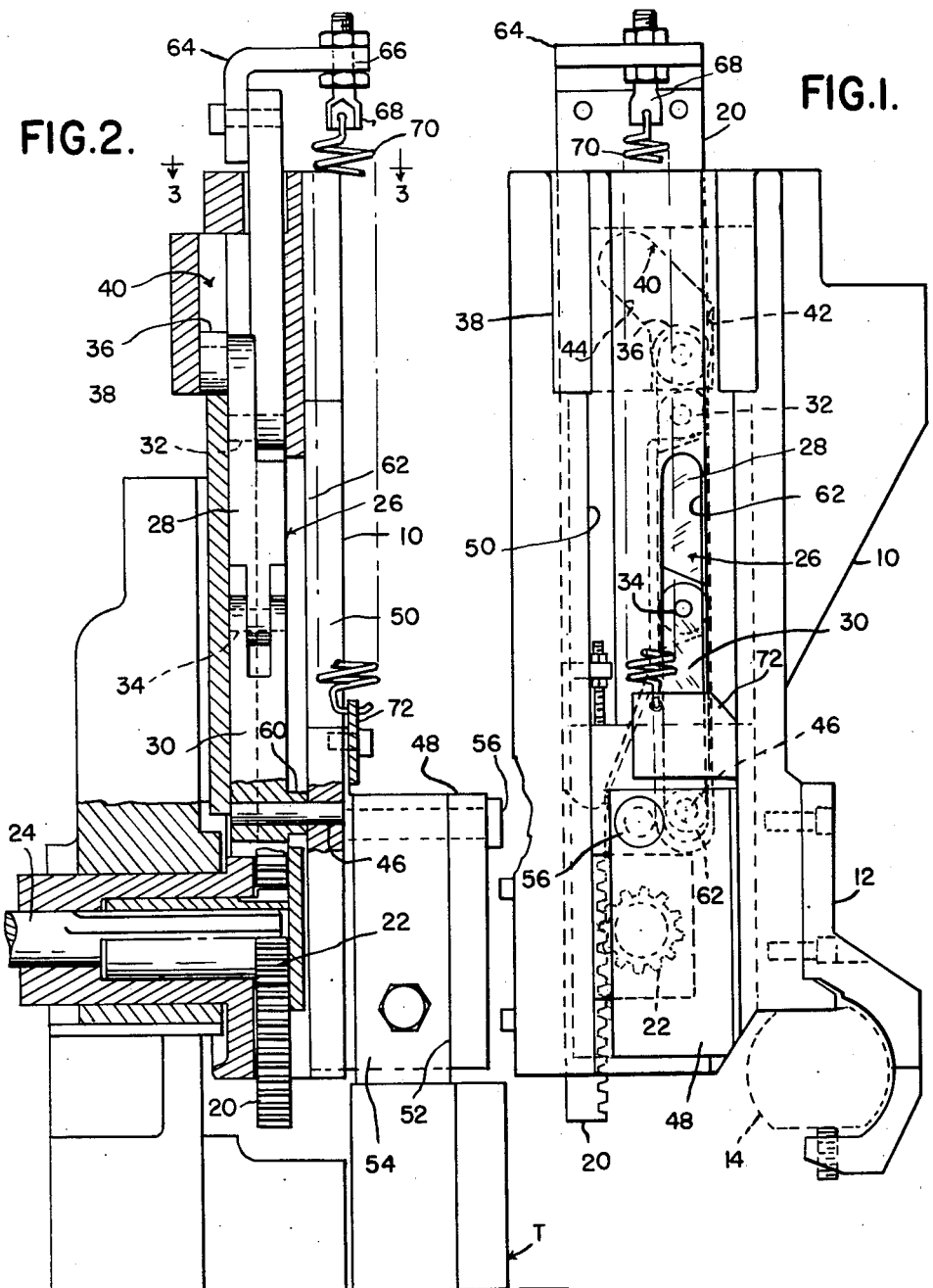

2,790,325

MACHINE TOOL SLIDE

Leo W. Bedker, East Detroit, Mich.

Application June 7, 1954, Serial No. 434,792

6 Claims. (Cl. 74—110)

The present invention relates to a machine tool slide.

It is an object of the present invention to provide in a machine tool actuating means for a slide thereon characterized by its ability to provide an exceptionally long stroke and for controlling the speed of movement of the slide during its stroke so as to provide maximum available power during the working portion of the stroke.

More specifically, it is an object of the present invention to provide an attachment for a machine tool having a slide, an actuator movable in parallelism with the slide, the attachment comprising a toggle device for connecting the actuator and slide, and cam means for breaking the toggle device during movement of the actuator in one direction and straightening the toggle device during movement of the actuator in the opposite direction.

More specifically, it is an object of the present invention to provide structure as defined in the preceding paragraph in which the cam means is constructed and arranged to retain the toggle device in straightened condition during the working portion of the stroke of the machine slide.

It is a further object of the present invention to provide an attachment for a machine tool designed to increase the stroke of a machine slide thereon.

Other objects and features of the invention will become apparent as the description proceeds, especially when taken in conjunction with the accompanying drawings, wherein:

Figure 1 is a front elevation of the attachment.

Figure 2 is a side elevation of the attachment with parts in section.

Figure 3 is a fragmentary section on the line 3—3, Figure 2.

Figure 4 is a diagrammatic view illustrating the parts in the position occupied at one end of the stroke.

Figure 5 is a view similar to Figure 4 illustrating the parts in the position occupied at the other end of the stroke.

Figure 6 is a fragmentary side view of the actuating lever and portions connected thereto.

Figure 7 is a fragmentary side view of the link and parts connected thereto.

In some cases machine tools such for example as screw machines, are provided with one or more slides such for example as tool slides, and include actuating means for reciprocating the slide toward and away from a work piece. For certain operations the amplitude of movement of the slide as controlled by the actuator is insufficient. The present invention relates to an attachment which may be provided on the machine tool which will increase the length of stroke of the slide while at the same time preserving the power available to move the slide at predetermined portions of the stroke. It will be appreciated that while the present invention is illustrated in the form of an attachment to be applied to an existing machine tool, the invention is of course capable of broader applications and involves structure which may be built into a machine tool or any appropriate structure as original equipment.

The attachment comprises a frame 10 adapted to be secured by a bracket 12 to a permanent part of the machine tool such for example as a bar 14 thereon. The machine tool includes a machine slide in suitable ways provided therefor. In the past slides of this type have been reciprocated by direct connection to a rack, such as the rack 20 which as herein illustrated as a part of the attachment, but which supplants a similar rack conventionally provided on machine tools. The rack 20 is engaged by a pinion 22 rigidly secured to a shaft 24 which is or may be a part of the machine tool. Means are provided for rotating the shaft 24 and in the unmodified machine tool rotation of the pinion drives the rack and produces a reciprocation of the rack of an amount determined by the angular movement of the shaft 24. In accordance with present invention the modified rack illustrated at 20 is provided and as best seen in Figures 4 and 5, the rack carries a toggle device indicated generally at 26 which comprises a lever 28 and a link 30. As illustrated, the lever 28 is pivoted intermediate its ends to the rack 20 by the pivot pin 32 and the lever 28 and link 30 are pivotally interconnected at their ends by a pivot pin 34. The pivot pin 32 in the illustrated embodiment of the invention is intermediate the ends of the lever 28, and at its other end the lever 28 carries a roller 36.

The frame 10 is provided with a removable cover 38 having a cam slot 40 formed therein in which the roller 36 is movable. It will be observed that the cam slot 40 includes a short vertical portion 42 and an inclined portion 44.

At its lower end the link 30 is provided with a pin 46 extending into a portion of an adaptor or slide block 48 reciprocable in vertical ways 50 provided in the frame 10. As best seen in Figure 3, the slide block 48 has a recess 52 for the reception of the upwardly extending end 54 of a tool T, such for example as a thread rolling fixture. Accordingly, vertical movement of the slide block 48 results in equal vertical movement of the tool T. As illustrated, the connection between the slide block 48 and the tool may be by a coupling pin 56, which permits rocking of the thread rolling fixture.

While the lower end of the link 30 is constrained to move in a vertical path by virtue of its connection to the slide block 48, preferably the lower end of the link, as best seen in Figure 2, is provided with a short tubular extension 60 which extends into a vertical slot 62 provided in the frame 10. This constitutes a guide for the lower end of the link.

At the upper end of the rack 20 there is provided a bracket 64 having an overhanging end portion 66 carrying an adjustable screw eye 68 to which is secured one end of a tension spring 70. The lower end of the tension spring 70 is connected to a plate 72 bolted or otherwise secured to an upstanding portion of the slide block 48, thus partially counterbalancing the weight of the slide block and the associated mechanism.

The operation of the structure is believed apparent from the foregoing description but certain advantages obtained will be pointed out. It will be observed that during initial upward movement of the rack 20 no rocking movement of the toggle device consisting of the lever 28 and link 30 takes place since at this time the roller 36 is moving in the short vertical portion of the cam slot 40. It will also be appreciated that this portion of the stroke represents the working portion thereof so that the full power available from movement of the rack 20 is employed in moving the slide. Slight additional upward movement of the rack 20 causes the roller 36 to enter the inclined portion 44 of the cam slot with the result that the lever 28 will be rocked counterclockwise to the position shown in Figure 5, and this will be accompanied by a breaking of the toggle device causing the lower end of the link 30, and particularly the coupling pin 46, to move relatively close to the pivot pin 32 which connects the lever 28 to the rack 20. It will thus be seen that for a given stroke of the rack 20, the slide is caused to have a substantially greater stroke. Moreover, this stroke is carried out at variable speeds due to the action of the toggle device so that full power is available during the working portion of the stroke.

Referring to Figure 4, it will be observed that near the lower end of the stroke, the lever 28 and link 30 are in over-center relation and bear against an abutment surface 74 on the rack. Accordingly, during downward movement of the rack 20, which corresponds to the working stroke, the toggle device is in over-center relation and becomes a rigid and fixed part of the rack so that movement of the slide block 48 and the tool T connected thereto is accomplished by what is in effect a direction connection to the actuating rack.

Accordingly, the present invention provides means for increasing the length of stroke of a slide member while preserving the full power thereof during the working portion of the stroke.

While in the illustrated embodiment of the invention, the adaptor or slide block 48 is shown as movable in the ways 50 which are a part of the attachment, it will be understood that in some cases the machine tool will have a slideway thereon of sufficient length to mount a slide for the required movement, even though the actuating mechanism does not provide the required length of stroke. In this case the attachment may include only such parts as are necessary to effect the required longer stroke of the slide provided on the machine tool.

The essential feature of the present invention is in the provision of means for connecting a reciprocable actuator to a longitudinally movable element so as to provide for a stroke of the element substantially greater than the movement of the actuator in such a way as to preserve the full power of the actuator at a required portion of the stroke. This permits adaptation of existing machine tools to different operations and increases the capacity of a machine tool for certain operations.

The drawings and foregoing specification constitute a description of the improved machine tool slide in such full, clear, concise and exact terms as to enable any person skilled in the art to practice the invention, the scope of which is indicated by the appended claims.

What I claim as my invention is:

1. Apparatus for increasing the stroke of a machine slide while retaining the power during the working portion of the stroke comprising an actuator having a short predetermined stroke, a lever pivoted to said actuator, a link pivoted at one end to said lever, a slide movable parallel to said actuator, means pivotally connecting the other end of said link to said slide, a cam at the side of the path of movement of said actuator, and a cam follower on said lever, said cam being shaped to move said follower laterally from the path of movement of said actuator to rock said lever and hence said link about their common pivot connection to cause movement of the end of said link connected to said slide in excess of the movement of said actuator.

2. Apparatus as defined in claim 1 in which said link and lever form a toggle connection, said cam being shaped to straighten said toggle connection near one end of its stroke so that during completion of the stroke, said slide moves at the same speed as said actuator.

3. Apparatus as defined in claim 2 comprising an abutment surface engaged by the interconnected ends of said lever and link in slightly over-center relation during completion of the stroke.

4. Apparatus for increasing the stroke of a machine slide while retaining the power during the working portion of the stroke at one end thereof comprising an actuator having a predetermined stroke, a machine slide movable parallel to said actuator, a toggle device including links having their adjacent ends pivoted together and having their other ends pivotally connected to said slide and actuator respectively for movement of said slide by said actuator, means operative to open and close the links of said toggle device in response to movement of said actuator to effect movement of said slide in excess of the movement of said actuator, said means being operative to straighten the links of said toggle device during movement of said slide through the working portion of its stroke, and an abutment surface engaged by said adjacent ends of said links in slightly over-center relation during the working portion of the stroke.

5. Apparatus for increasing the stroke of a machine slide while retaining the power during the working portion of the stroke comprising an actuator having a short predetermined stroke, a lever member pivoted to said actuator, a link member pivoted at one end to said lever member, a slide movable parallel to said actuator, means pivotally connecting the other end of said link member to said slide, cam means including a cam follower on one of said members operative, in response to movement of said actuator, to rock said members about their common pivot connection to cause movement of the end of said link member connected to said slide in excess of the movement of said actuator.

6. Apparatus for moving a machine slide in forward and reverse directions and increasing the stroke of the machine slide while retaining the power during the working portion of the forward movement at one end thereof comprising an actuator movable in forward and reverse directions and having a predetermined stroke, a machine slide movable parallel to said actuator, a toggle device including links having their adjacent ends pivoted together and having their other ends pivotally connected to said machine slide and actuator respectively for movement of said machine slide by said actuator in forward and reverse directions upon corresponding movement of said actuator, and cam means including a cam follower on said toggle device operative to close said links upon reverse movement of said slide and to open said links upon forward movement of said slide and to straighten said links during the working portion of the forward movement of said slide.

References Cited in the file of this patent

UNITED STATES PATENTS

| 455,248 | Fennell | June 30, 1891 |
| 2,162,133 | Spire | June 13, 1939 |
| 2,460,658 | Roehri | Feb. 1, 1949 |
| 2,694,935 | Roehri | Nov. 23, 1954 |